United States Patent [19]

Nelson et al.

[11] 4,399,422
[45] Aug. 16, 1983

[54] MAGNETIZING APPARATUS

[75] Inventors: Alfred M. Nelson, Redondo Beach, Calif.; Houshang Rasekhi, Convent Station; John J. Sudano, Paterson, both of N.J.

[73] Assignee: Wang Laboratories, Inc., Lowell, Mass.

[21] Appl. No.: 297,672

[22] Filed: Aug. 31, 1981

[51] Int. Cl.³ .............................................. H01F 13/00
[52] U.S. Cl. .................................. 335/284; 118/640; 360/134; 417/48
[58] Field of Search .................... 335/284; 118/640; 360/134; 427/47, 48

[56] References Cited

U.S. PATENT DOCUMENTS

| 3,117,065 | 1/1964 | Wootten | 118/640 X |
| 3,441,884 | 4/1969 | Eppe | 335/284 |
| 4,043,297 | 8/1977 | Hartmann et al. | 335/284 X |
| 4,177,442 | 12/1979 | Bate et al. | 335/284 |
| 4,197,989 | 4/1980 | Pearce | 360/134 X |
| 4,253,127 | 2/1981 | Kodama et al. | 360/134 X |

Primary Examiner—George Harris
Attorney, Agent, or Firm—Michael H. Shanahan; Joseph E. Funk

[57] ABSTRACT

Apparatus is provided for uniformly premagnetizing magnetic media, such as wide magnetic tapes and/or for substantially uniformly orienting the magnetic particles in the slurry of the magnetizable layer of magnetic media during their formation. Premagnetization constitutes magnetizing the medium in a preselected direction, such as the transverse direction (i.e., perpendicular to the intended direction of movement of the recording medium past a recording head but in the plane of the medium), prior to magnetically recording information thereon. The apparatus comprises a number of predeterminably arranged small magnets disposed proximate to the medium which obviates the need for large, expensive, heavy magnets and magnet systems. A continuous transverse saturation level of magnetization is provided in the medium with virtually no vertical or longitudinal magnetic components or anomalous effects. A preferred arrangement comprises a number of wafer magnets each having an elongated edge of a pole face disposed proximate to the medium and at a preselected acute angle relative to the direction of intended movement of the magnetic medium.

10 Claims, 10 Drawing Figures

MAGNETIZING APPARATUS

BACKGROUND OF THE INVENTION

This invention relates to preorientation of the magnetic particles of and premagnetization of magnetizable media, particularly wide magnetic tapes.

As used herein the term premagnetization refers to the state of a magnetizable medium being initially magnetized substantially to saturation in a selected direction prior to the medium being employed for recording of information. As such, premagnetization preferably would be effected prior to each instance of information being recorded thereon. The term information as used herein constitutes latent magnetic images generated in the magnetizable layer of the magnetic medium, which images are, for example, composed of numerous minutely sized magnetic zones called pixels, arranged to form say characters. Each pixel constitutes for instance a 4-mil by 4-mil zone wherein the initial direction of magnetization, i.e., the premagnetization condition, has been reversed by an external magnetic field. The direction of magnetization preferred and specifically contemplated herein is the so-called transverse direction, i.e., the direction perpendicular to the intended direction of movement of the medium past a recording head (or perpendicular to the longitudinal axis or side edge in the case of a magnetic tape) but in the plane of the medium. Thus the present invention relates in particular to the repetitive creation, in magnetic media, especially in wide magnetic tapes, of the state of substantially saturated transverse premagnetization.

As used herein the term preorientation refers to the act of physically effecting the substantially unidirectional oriention or alignment of the magnetic particles or crystals of the magnetizable medium while the magnetizable layer is in the slurry state during the formation of the medium. Most of the commercially desirable materials utilized in forming the magnetic layer, such as chromium dioxide ($CrO_2$), are comprised of elongated magnetizable particles or crystals. Generally these particles exhibit their best operative magnetic characteristics (e.g., magnetic remanence and "squareness") if they are magnetized by an external field having the direction of its magnetization parallel to the long axis of the magnetizable particles or crystals. Thus, the present invention relates in particular to the preorientation of the magnetizable particles of magnetic media, especially wide magnetic tapes, in the contemplated operative transverse direction. For a more complete understanding of the above-discussed aspects, the reader is referred to one such premagnetization operation using a preoriented magnetic tape as described in U.S. patent application Ser. No. 268,595, filed May 29, 1981.

Generally, for relatively narrow magnetic media (e.g., magnetic tapes around three inches or less in width) the magnetic structures presently employed are sufficiently small, compact and/or light weight to be well adapted for most applications of premagnetizing. For relatively wide magnetic media (e.g., tapes with width>three inches), however, substantially larger permanent magnets are needed to span the greater width, which are impractical for gap dimensions in the range of six inches and larger. Although these large permanent magnets generally operate satisfactorily in substantially uniformly premagnetizing such wide tapes, they are undesirably bulky and heavy and relatively very expensive. As such they are commercially unattractive.

Generally an effective geometry for a magnetizing structure in terms of maximizing field strength is a u-shaped or preferably a c-shaped structure. Moreover, a pair of such structures placed in opposition of one another with the magnetizable medium arranged to be movable therebetween within the pole gaps is a most efficient way of providing a uniform magnetization of the medium, with virtual elimination of so-called vertical components.

For longitudinal premagnetization, an u-shaped structure with elongated pole faces may be readily utilized, inasmuch as the structure is simply arranged transverse to the direction of the medium's movement. As such, the structure is merely made as long as needed to span the entire (or desired) width of the medium. With such a structure orientation, longitudinal premagnetization can be readily effected with a small-gap magnetizing structure, and as such the structure can be of relatively low weight and inexpensive.

The situation becomes quite different, however, for transverse premagnetization, in that such a structure would have to be arranged longitudinally, i.e., arranged lengthwise in the intended direction of tape movement to achieve the desired transverse direction of magnetization. For a narrow tape, a small-gap structure may still be effectively utilized, since the gap should be large enough to accept the entire width (or desired portion of the width) of the narrow tape (e.g., one-half inch) to uniformly premagnetize the tape by itself. On the other hand, utilization of such a small-gap structure to provide transverse magnetization would enable one to magnetize only a small portion of the total width of a wide medium. Moreover, nothing is gained by the elongated pole faces of the above-mentioned structure with such an orientation.

In the case of wider tapes, (e.g., in excess of three inches), it thus follows that for single-structure uniform premagnetization, the gap of such structure must remain as great as or greater than the width of the medium (or the desired portion thereof). The result is that it becomes commercially impractical to provide single-structure arrangements to premagnetize wider mediums transversely, since such structures would necessarily be quite costly, bulky and heavy. This may be particularly appreciated in connection with such applications as office printers. It will be appreciated too, that a single-structure arrangement is particularly disadvantageous for applications employing endless "web" mediums of say eleven inches or more.

The above considerations are compounded when it is desired to have a pair of such structures arranged to oppose one another on either side of the medium for eliminating vertical magnetic components. That this approach is commercially prohibitive can be readily gathered from the considerations that the cost of such an arrangement would be in the hundreds of dollars, its size would be entirely impractical, and its weight would be excessive, (most probably in the range of several hundreds of pounds).

What is needed and would be useful, therefore, is an apparatus which would be capable of uniformly premagnetizing relatively wide magnetic tapes and yet would eliminate the above-mentioned undesirable features, and such is a primary objective of this invention.

With regard to preorientation of magnetic tapes, particularly wide tapes, and especially so-called high coercivity media, present needs are served with relatively very large, heavy and costly, specially designed magnet arrangements. This is so essentially because relatively very large magnetic fields are generally needed to preorient such materials with any appreciable commercial rate of throughput. More specifically, the magnitude of the external magnetic field needed to preorient the magnetic particles is a function of the magnetic material of the medium itself (i.e., the coercivity level, the concentration of magnetic pigment, etc.), the viscosity of such material in the slurry state during preorientation, and the rate of throughput. The faster such rate is, for example, the higher the field that is needed to substantially uniformly align the magnetic crystals. On the other hand, the more viscous the material the longer it takes for the magnetic particles to align, and thusly the higher the influencing magnetic field which is needed to increase the overall rate at which alignment is achieved. Therefore, in order to have the viscosity at manageable levels in a commercial process, the aligning magnetic arrangement must be placed as close to the slurry deposition apparatus as practicably possible. However, because of the relatively great size of such magnets, one only position the magnet just so close to the deposition apparatus. To compensate for this the slurry mixture would need to be provided with a greater amount of solvent or a slower evaporating solvent to avoid the magnetic pigmented slurry from becoming too viscous before fully reacting to and leaving the magnetic preorienting field and station, which compensating factor tends to slow the formation process down appreciably.

What is needed and would be useful, therefore, is a magnetic field-producing apparatus providing a sufficient external magnetic field to substantially uniformly preorient the magnetic particles of the slurry that comprises the magnetizable layer of a magnetic medium, which apparatus is relatively small in size and lightweight and, in terms of its external magnetic field, thus may effectively be positioned appreciably closer to the deposition apparatus, thereby tending to relieve the concern regarding solvent/viscosity/time criticality, and such is another principal objective of this invention.

SUMMARY OF THE INVENTION

According to the broader aspects of the invention, the afore-mentioned concerns are solved by apparatus for applying magnetic fields to a magnetizable medium which comprises a plurality of permanent magnets disposed proximate to the magnetizable medium for producing a plurality of magnetic fields in a selected direction sufficient to effect preorientation and/or premagnetization of the medium.

Accordingly, an apparatus is described and illustrated herein as a preferred embodiment of the present invention having a plurality of small elongated block magnets adjacently disposed in a linear array above and/or below the medium across the width thereof, with an array of small blocks of high magnetic permeability material interleaved between the magnets and extending beyond the magnets toward the recording medium. The magnetic field provided by such arrangement is substantially unidirectional in the plane of the medium, in a direction parallel to the linear array and preferably transverse to the side edge or longitudinal axis or the intended direction of movement during recording of the magnetizable medium. A principal advantage of such apparatus with two of such arrays facing each other with the medium therebetween, is that virtually all vertical field effects and other undesirable and/or anomalous effects are virtually eliminated in obtaining a uniform, unidirectional induced magnetic field in the magnetic medium. A special feature of this preferred embodiment is that the magnetic arrangement can be extended in either direction as long as needed to accommodate any practical magnetic medium width (or length for that matter), without materially altering the induced magnetic field uniformity and directionality, and the elimination of magnetic anomalies. Another most significant feature of this magnetic system is that it is particularly useful for preorientation as well as premagnetization.

Another preferred embodiment of apparatus according to the present invention described and illustrated herein, has a plurality of small elongated wafer magnets disposed substantially parallel to each other and in partially overlapping relationship, proximate to the magnetizable surface of the tape and across the width of the tape for premagnetizing the tape across its width. The magnets are angularly arranged to have a pole face longitudinal edge thereof most proximate to the tape medium to take advantage of the field concentration provided by the edge geometry.

BRIEF DESCRIPTION OF THE DRAWINGS

The invention should become better understood with reference to the following detailed description taken in conjunction with the accompanying drawings, in which.

DESCRIPTION OF PREFERRED EMBODIMENTS

Reference is made to FIGS. 1 through 5, which illustrate a first preferred embodiment of the present invention, utilizing small bar magnets. In connection with magnetic structures having the geometry of a wafer magnet, it has been found that the magnetic field intensity at the edges of the magnet poles is relatively the strongest. Moreover, the tangential component (i.e., the in-plane component with respect to the magnetic medium) of the field intensity at the edges of the magnet poles can successfully be utilized to magnetize or magnetically orient the magnetic recording medium.

Figure 1:
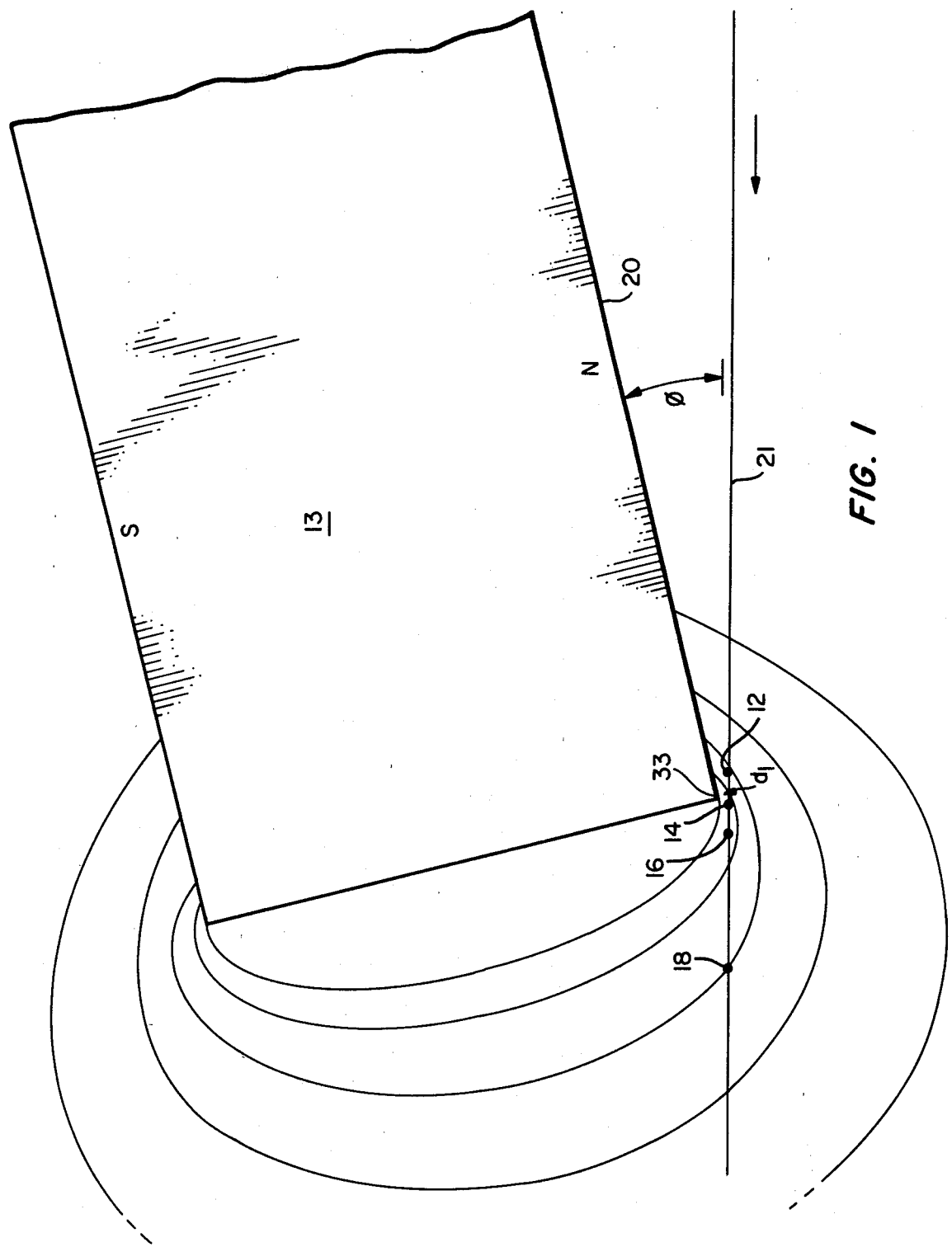
FIG. 1 illustrates an enlarged end view of a portion of one of a plurality of magnets oriented relative to a magnetizable medium in a first preferred arrangement of the present invention, wherein each magnet is arranged to provide its magnetic field to the magnetizable medium via the longitudinal edge of a pole face which is most proximate to the medium.
Figure 2:
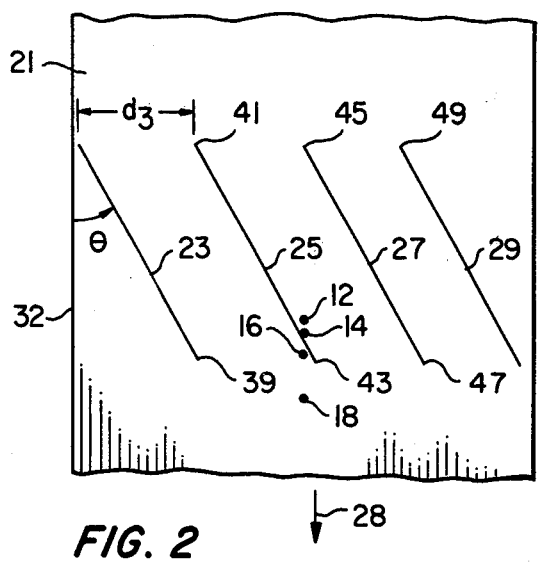
FIG. 2 illustrates in a top view the orientation of a plurality of magnetic elements according to FIG. 1 with respect to a relatively wide magnetic tape.

With reference to the respective enlarged end and top views of FIGS. 1 and 2, there is illustrated the first preferred embodiment which comprises a plurality of small, wafer-shaped permanent magnets, which by way of example may take the form of barium ferrite magnets, having dimensions approximately one inch in width (w) and two inches in length (l), by ⅛ inches thick (i.e., between the poles). Each such magnet is disposed to have the intended operative portion thereof comprise a lowermost edge (only a single magnet 13 and its corresponding pole edge 33 are shown in FIG. 1) located at a distance $d_1$ from the magnetizable surface layer of a magnetic medium such as a tape 21. The latter is intended to move relative to the magnets in a somewhat left-to-right direction as depicted in FIG. 1 and a top-to-bottom direction in FIG. 2. $d_1$ preferably would have the range of 0 to 0.015 inches with a most preferred dimension as small as practically possible. Edge 33 constitutes a pole face side edge of one of the poles (e.g., North) 20 of the magnet 13 in FIG. 1. The entire magnet is tilted relative to the plane of the magnetic medium 21 to have the pole face 20 of the magnet 13 form an angle $\phi$ with respect to the medium. As such, the opposite pole face side edge of the north pole 20 (not particularly shown) would be positioned a distance $d_2 >> d_1$ from the medium. The angle $\phi$ can preferably assume a value anywhere in the range of 10° to 30°, depending, for example, on the distance between respective pole face side edges and the strength of the magnet's external field, and to some extent on the distance $d_1$. The angle $\phi$ would vary inversely with respect to the distance between the pole face side edges and directly with respect to field strength. It is intended, in any event, that the aforementioned opposite pole face side edge be sufficiently removed from the medium 21 to avoid having the concentrated field associated thereto adversely affect the magnetization of the medium provided by the most proximate pole face side edge 33. In this way, essentially only the in-plane transverse magnetic effects provided by edge 33 will be realized in the relatively high coercivity magnetic medium 21.

As may be gathered from FIG. 2, the magnets are arranged substantially parallel and are equidistantly positioned at a distance $d_3$ from each other across the width of the tape 21. Further, they are skewed with respect to the tape 21 such that each of the respective loci of points 23, 25, 27, 29 constituting the projected longitudinal edge (e.g., edge 33 in FIG. 1) onto the medium 21 makes a selected angle $\phi$ (e.g., fifteen degrees) with respect to the direction of intended movement of the tape (indicated by arrow 28) or of the edge 32 or longitudinal axis of the tape relative to the magnet 13. Also, the magnets are arranged so that the end portions of their respective edges (corresponding to projected end portions 39 and 41, 43 and 45, 47 and 49 of the loci 23, 25, 27, 29 in FIG. 2) overlap somewhat in the longitudinal direction 28 of the tape 21 to ensure that full coverage of the tape surface 19 across its width is provided by the operative edges of the magnets. The dimension $d_3$ preferably should approach the value of the magnet length (corresponding to the length of the respective locus of points) times the tangent of the skew angle 0 in order to minimize the number of magnets to be utilized while ensuring there is some operative overlap of these magnets. Preferably the arrangement of magnets would be such that in the described orientation they are contiguous, pole face to pole face, with a portion of the operative pole face of the first magnet contacting a portion of the non-operative pole face of the next magnet and so on.

FIG. 1 particularly illustrates the pattern of magnetic flux lines (i.e., the magnetic field pattern) associated to the magnet edge 33 disposed most proximate to the tape 21. It has been found that the magnetic field is stronger toward the pole face side edges of a magnet of such geometry due to the shortened flux path or concentration of the flux lines about these edges of the magnet, and becomes strongest and most concentrated at the very side edges of the pole faces. A point on the medium, which is depicted at various positions 12, 14, 16, 18 in FIGS. 1 and 2 in the movement thereof relative to the magnet array, approaches the area of maximum magnetizing influence and then moves away. As particularly seen in FIG. 1, the point to be magnetized first experiences steadily increasing field lines, until point 12 is reached where the field is becoming sufficiently high to have a magnetizing influence on the relatively high-coercivity medium. The field at point 12 is substantially horizontally oriented, and as such would have a corresponding horizontal alignment effect upon the medium 21.

As the point continues to move leftwardly in FIG. 1, it reaches point 14. Here, the field is strongest, inasmuch as the point is closest to the operative pole face side edge 33 of magnet 13. The effects of the field previously experienced are replaced with the orientation provided by the stronger field at position 14. As shown, the inducing field is virtually completely in-plane (horizontal) at this point.

Now, as the point proceeds to position 16, it is experiencing a progressively reduced inducing field. It is noted that here, while the effects of the magnet 13 are likely to be sufficient to significantly contribute to the final magnetic orientation of the medium, the direction of the induced magnetization is in large part desirably horizontal (in-plane) and transverse. Finally, the point continues its movement until a position 18 is reached. Here though the inducing field is increaingly vertical, it is sufficiently weak to be unable to significantly alter the direction of magnetization induced in the tape 21 via the pole face edge 33.

To prevent possible adverse effects due to the longitudinally directed magnetic field intensities at the ends (e.g., 39, 41, 43, 45 . . . ) of the magnets, the end magnetic fields may be shunted away from the magnetic medium via relatively high permeability material appropriately affixed to these end surfaces. Alternatively, the lower corner of the trailing edge of the magnet may be shaved off to virtually eliminate these potentially adverse effects.

Figure 3:
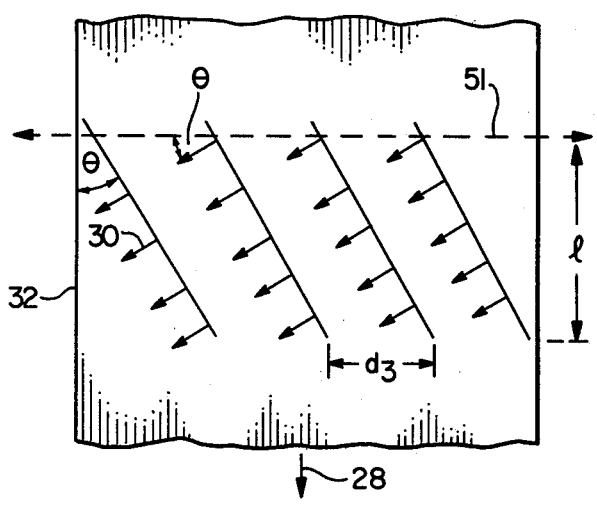
FIG. 3 illustrates the direction of the inducing field provided by the magnetic elements of the apparatus of FIGS. 1 and 2.
Figure 4:
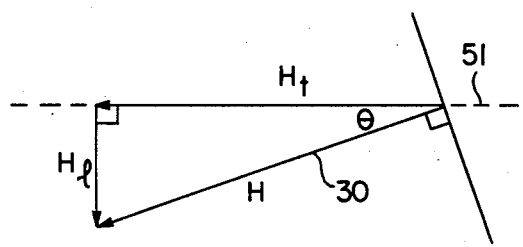
FIG. 4 is a graphic illustration of the components of a magnetic vector representative of the magnetic field illustrated in FIG. 3.

As shown in FIGS. 1 and 3, the concentrated field at the proximate side edge of the pole face of each magnet may thus be utilized to premagnetize (i.e., magnetize in a selected direction in preparation for subsequent recording) an area of the tape medium having (at any particular point in time) length (l) and width (w), as the tape is moved relative to the magnet in the direction 28 (FIG. 3). Each magnet subjects the portion of the tape, i.e., locus 23, 25, 27, 29 (FIG. 2) under its operative edge (e.g., edge 33) to the associated magnetic field, tending to create in such a portion a direction of magnetization as indicated by vectors 30 (FIG. 3) along the locus. The direction of such magnetization is perpendicular to the locus and forms the small angle ($\theta$) with the transverse direction 51. Inasmuch as the direction of such premagnetization is not exactly parallel to the transverse direction (i.e., the direction of premagnetization is not precisely in the same direction as the transverse direction 51, but rather forms the small angle $\theta$ with it), the orientation of magnets with respect to the longitudinal tape edge 32 (or direction of tape movement), and hence the angle $\theta$ formed with the transverse direction may be selected so that a substantial and predominant component of each vector 30 is in the transverse direction. The direction of premagnetization and thus the direction of the predominant vectorial component is oppositely directed or disposed with respect to the intended direction of magnetization for recording images (and to previously recorded image segments or picture elements (pixels), thereby effectively erasing such pixels as premagnetizing of the tape occurs). This predominant component, identified as transverse component $H_t$ in FIG. 4, is shown together with a substantially lesser component $H_l$ identified as the longitudinal component. These magnetic vector components may be represented as:

$$H_t = H \cos\theta \qquad (1)$$

$$H_l = H \sin\theta \qquad (2)$$

For transversely oriented $CrO_2$ particles with a typical coercive force of 550 oersteds as the magnetizable material of the recording medium, as example, it has been found that an external magnetic field of approximately seven hundred oersteds, applied at angle $\theta \approx 15°$ with respect to the transverse direction 51, is sufficient to orient the tape to the transverse premagnetized condition, i.e., to generate the magnetic component $H_t$ of sufficient strength.

From FIG. 4, it can be seen that the greater the angle ($\theta$), the smaller the $H_t$ component and the larger the $H_l$ component. Suitable $\theta$, and $H_t$ may be determined empirically for the particular magnetic tape selected and the number and length as well as the rest of the geometry and the material of the magnets used. Thus, in terms of the magnetic field necessary to effectively saturate the tape in the transverse direction in the above example, $H_t$ and $H_l$ may be expressed as:

$$H_t \leq 800 \text{ oersteds} \qquad (3)$$

$$H_l < H_o \qquad (4)$$

where $H_o$ represents the largest magnetic field component that may be tolerated without causing deficient premagnetization of the tape.

Figure 5:
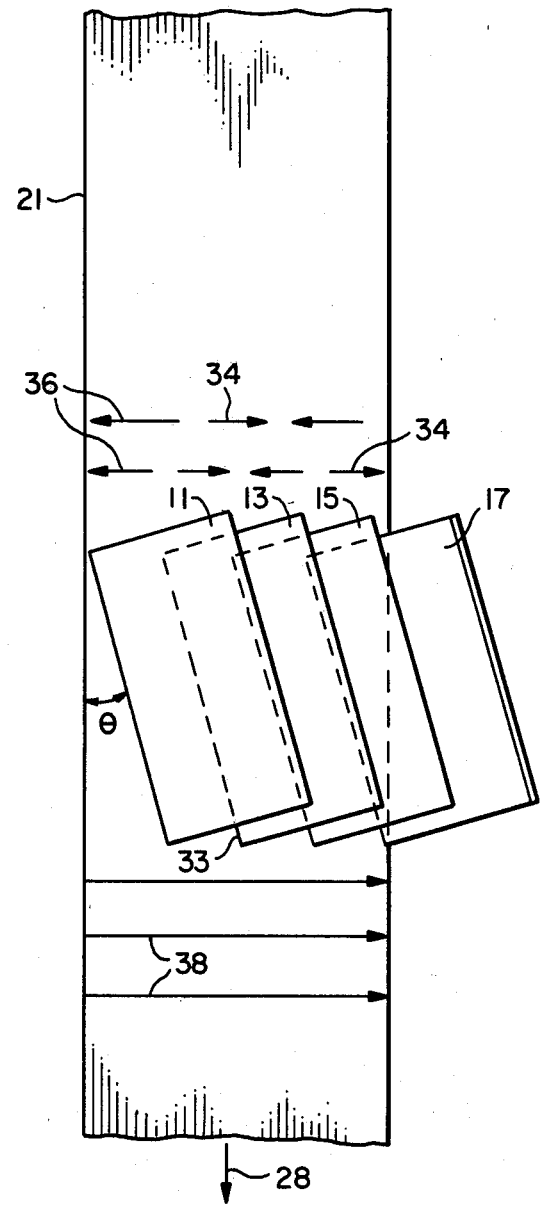
FIG. 5 is a schematic illustration of the magnetic effects produced by the magnetic elements of the apparatus of FIGS. 1 and 2.

FIG. 5 illustrates an example of premagnetization where a previously recorded image becomes erased as a result of the premagnetization process. Arrows 34 represent the remainder of the premagnetized areas left from the previous image recording (i.e., those areas which are intentionally unaffected by the previous recording of information). Arrows 36 represent the image elements or pixels produced as a result of the previous recording operation. Arrows 38 represent the resultant premagnetization of the tape 21 due to a reversal of the pixels 36 by the premagnetizing magnets prior to a subsequent recording operation.

Figure 6A:
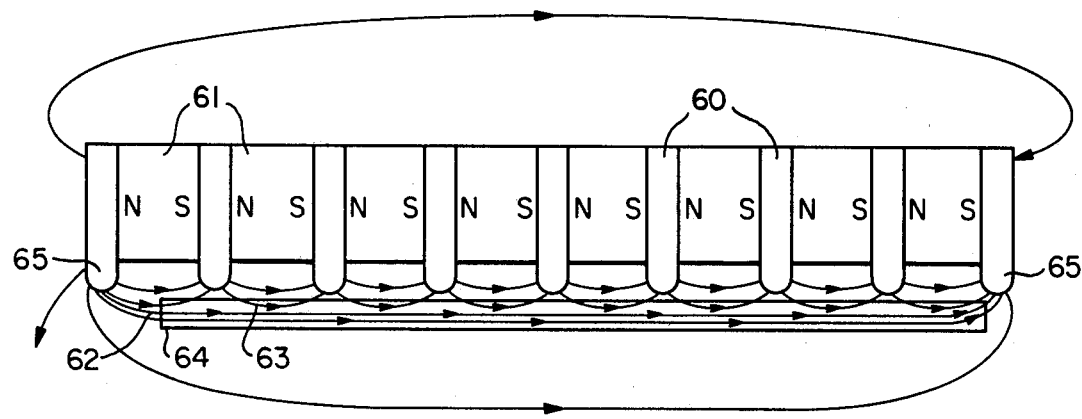
FIGS. 6A through 6C are schematic illustrations showing a preferred alternative arrangement of small magnets relative to the recording medium.

FIG. 6A illustrates an alternative embodiment of magnet arrangement for providing a relatively wide and substantially uniformly effective orienting magnetic field, which embodiment may be utilized for either premagnetization or preorientation. In this arrangement, which illustrates the magnets relative to a recording medium 64 that is movable into or out of the page, small high-permeability pole pieces 60 are placed between cascaded equi-dimensioned, small permanent magnets 61 and also at either end of the magnet array. Pole pieces 60 extend beyond the operative faces of the magnets 61 in the direction of the recording medium 64, to provide an orienting magnetic field intensity 62 that effectively interacts with the magnetic medium 64. The extending ends 65 of the pole pieces 60 can be structured advantageously to shape the pattern 63 of the orienting magnetic field at the magnetic medium for a minimal perpendicular component and, therefore, a maximal desired horizontal component.

In practice, the array of magnets 61 and interleaved pole pieces 60 may be extended at either end to effectively accommodate the widths of the very widest mediums. For premagnetization, the following example construction may be utilized. The pole pieces 60 may have a depth dimension (that direction which extends in parallel with the intended direction of medium movement) on the order of one to two inches, a width dimension on the order of 0.05 inches and a height dimension (i.e., the dimension parallel to the direction normal to the plane of the recording medium 64) on the order of 0.25 inches, for permanent magnets (e.g., of ceramic ferrite) having geometries on the order of one to two inches in depth, 0.2 inches in width and 0.2 inches in height. The entire weight of an array constructed in this manner for premagnetizing a recording medium of say nine inches in width may be approximately 4 lbs. For preorientation purposes, similar geometries to the above magnets constructed of a higher energy product such as samarium cobalt, will be able to yield fields strengths typically on the order of 1500–2000 gauss and more.

Figure 6B:
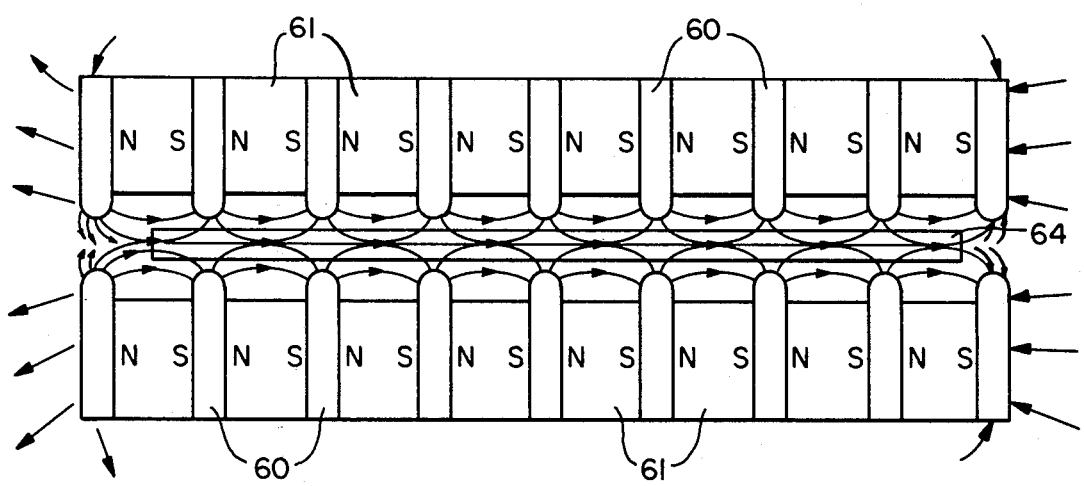

To assure virtual elimination of the perpendicular component of the magnetic field and increase the intensity of the horizontal component at the magnetic medium, a second magnet arrangement, substantially identical to the first arrangement shown in FIG. 6A, can be placed symmetrically opposite to the first arrangement with the recording medium therebetween. Such a symmetrical magnet arrangement is illustrated in FIG. 6B. It can be appreciated that such an opposing and symmetrical magnet arrangement will effect cancellation of the normal components of the magnetic field at a distance halfway in between the pole pieces of the first and second magnet arrangements, i.e., the intended location of the moving medium, for substantially equal intensities provided by the opposing arrays.

Figure 6C:
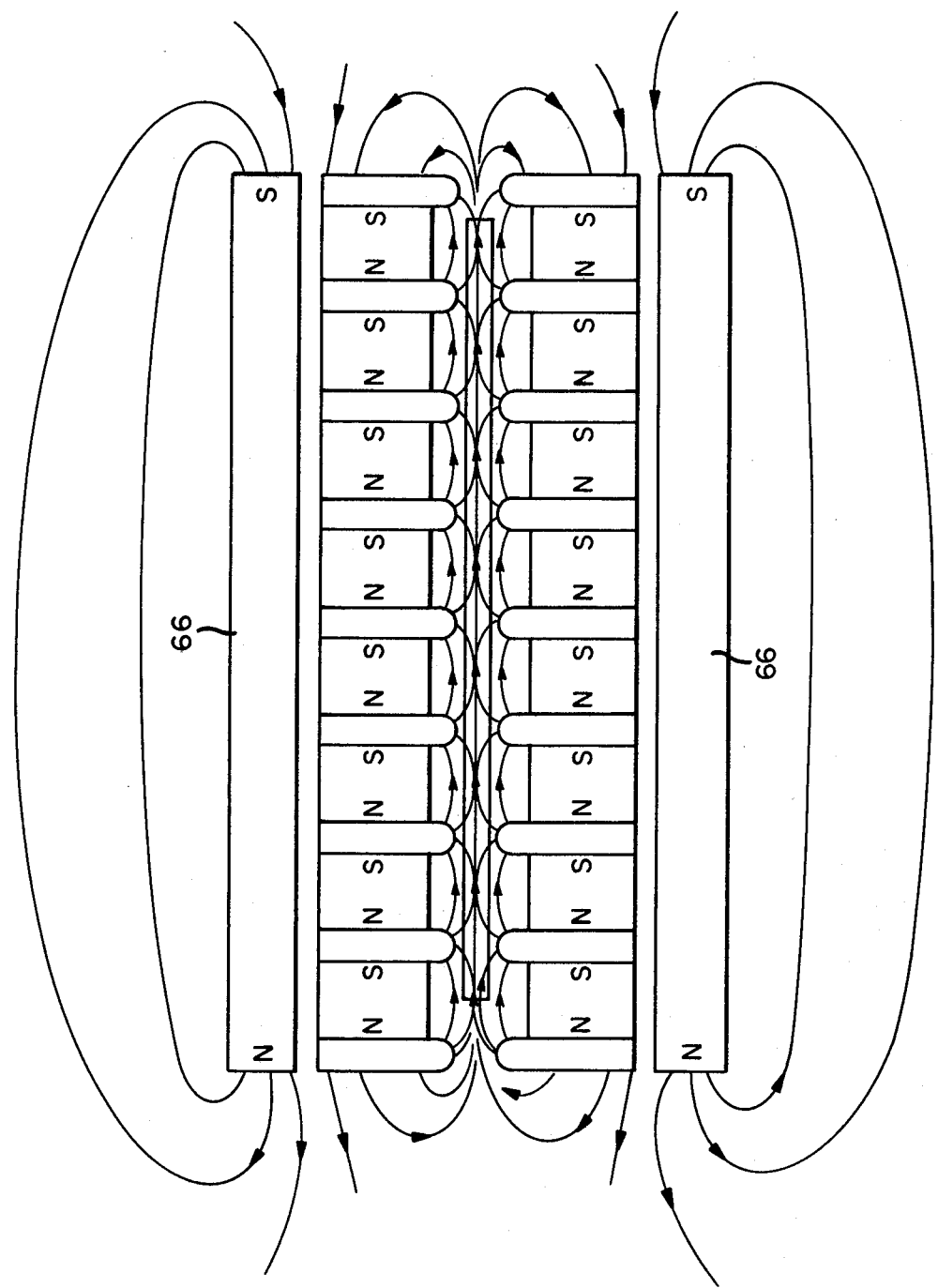

To effectively divert part of the magnetic field from the outside space of the orientor to the inside where orientation of the magnetic medium takes place, a reinforcing magnet 66 may be placed to the outside of the orientor, as shown in FIG. 6C. As depicted, the polarity of the reinforcing magnet 66 is selected to create an opposing magnetic field to the outside field of the orientor, thereby diverting this latter magnetic field into the orientor and increasing the magnetic field intensity at the operative surface.

Figure 7A:
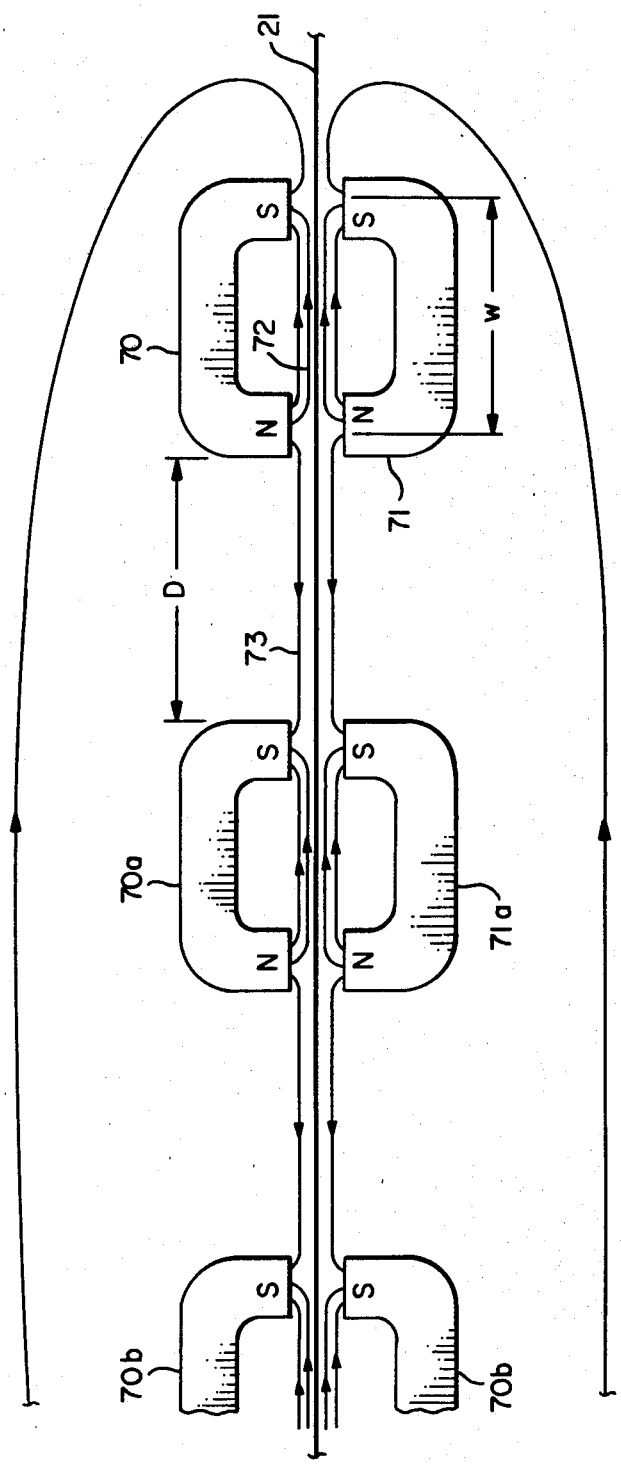
FIGS. 7A and 7B are schematic illustrations showing another alternative arrangement of magnets.
Figure 7B:
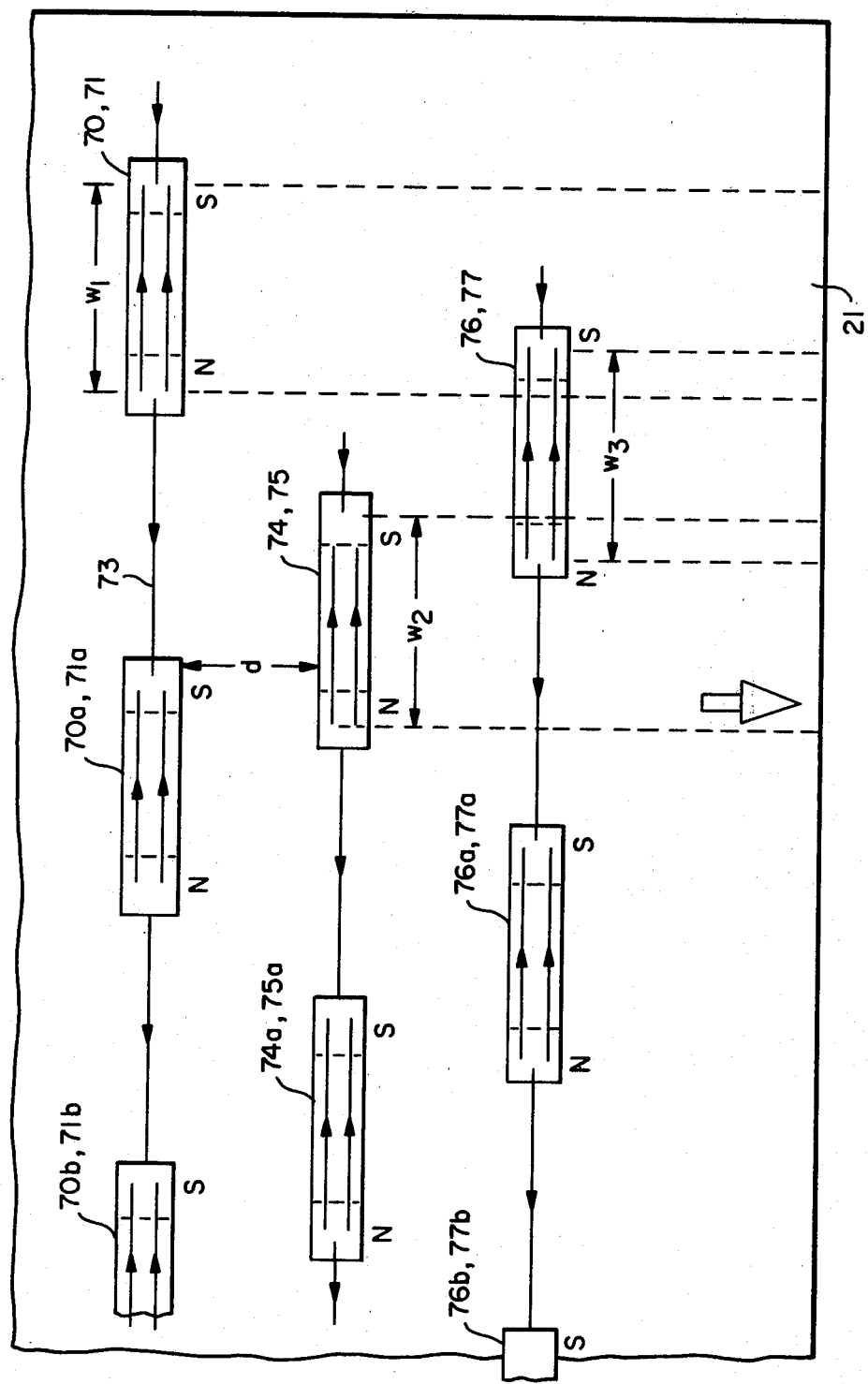

FIGS. 7A and 7B illustrate another embodiment of small magnets for a magnetic orientor useful in connection with the transverse premagnetization for wide medium applications. As illustrated in side view in FIG. 7A, this embodiment is comprised of pairs of u-shaped or preferably c-shaped or ring magnets 70, 71 opposing each other and symmetrically positioned to create orienting magnetic fields 72 in between the poles of the magnets. The magnets could, however, be shaped as bar magnets. The magnetic medium 21 is located between the paired magnets, at a distance approximately halfway between, and is intended to move in the direction normal to the plane of the page. Thus, a pair of small magnets with sufficiently high magnetic field intensity will orient a width strip "w" of the medium, which strip may typically be one inch wide. The interaction between adjacent pairs of magnets (e.g., 70, 71 and 70a, 71a) causes a magnetic field 73 that is undesirable in that it is in a direction which is opposite to the intended direction of premagnetization. However, the distance "D" between pairs of magnets is chosen to be sufficiently large to reduce the field intensity of the disorienting field 73 to an ineffective value i.e., a value sufficiently below the coercive forces of the magnetic medium. Moreover, by the nature of the opposing pairs of magnets, vertical field components are virtually eliminated. For the examples herein depicted of this embodiment of the invention, it is contemplated that the tape medium would exhibit relatively high coercivity, such as a $CrO_2$ or cobalt-modified iron oxide medium.

A more complete illustration of the magnet arrangement of FIG. 7A is shown in the top view of FIG. 7B. Additional rows of magnet pairs 74, 75 and 76, 77 are shown, with each magnet pair of each row providing an orienting field corresponding for example with respective overlapping widths $w_2$, $w_3$, and so on, of the medium. In particular, the magnets of each row are arranged to be spaced apart substantially end-to-end, with an end portion of one magnet of one group or row overlapping an end portion of the next most proximate magnet of the next group, or row, thus providing a substantially overlapping arrangement of magnets with regard to the direction of movement (length) of the tape. In this way the desired width of a wide magnetic tape may be uniformly premagnetized.

Similar to the above discussion, the distance d between the rows of the magnets is chosen long enough to minimize interaction between magnet pairs of the adjacent rows. For example, if d were to be inappropriately short, magnet pairs 70a, 71a and 70, 71 could shunt away the orienting field of the magnet pair 74, 75. It is noted that the magnet pairs 76a, 77a and 76, 77 could have a similar effect on the magnet pair 74, 75. It will be appreciated that the minimum distances between adjacent pairs of magnets and between the magnet rows is related primarily to the magnet dimensions and the coercive forces of the magnetic medium to be utilized.

FIG. 7B illustrates a preferred compact arrangement of small u-shaped magnets each able to orient say $CrO_2$ magnetic tape, in which the magnets are arranged in transversely extending rows, with the magnets of each succeeding row being staggered relative to the previous row so that each is assigned its own width segment of the medium and yet the width segments overlap somewhat to ensure uniform transverse premagnetization. It is to be understood, however, that numerous other magnet patterns can be realized. For example, a "v" shaped array, a side ways "v" array, or two or more "v" patterns arranged next to each other or opposed to one another with staggered coverage, could be realized for the orientor design. Also, an array comprised of magnet pairs in a single skewed straight line can be effectively operative. The angle at which a line/row (or lines/rows) of magnets may form with the direction of tape movement may vary operably from 90°, in the case of the rows of magnets extending transversely from one side of the medium to the other in FIG. 7B, to relatively low angles (e.g., 15°) for a compact double-v or like magnet arrangements, with the single skewed line arrangement typically assuming an angle in between (e.g., 45°). It is important in any of these design patterns, however, to keep the magnet pairs appropriately far enough away from each other to prevent the creation of disorienting fields or the weakening of the orienting magnetic fields, and also to conserve the space needed for the premagnetizing array.

What is claimed is:

1. Apparatus for applying magnetic fields to a magnetizable medium to render same substantially uniformly magnetized in one direction across and parallel to the medium and comprising:

a first plurality of magnets arranged in an array extending across the width of said medium and the magnetic fields created by each of said first plurality of magnets interact to effect a substantially uniform and continuous magnetic field in said one direction across said medium, and a second plurality of magnets arranged in an array extending across the width of said medium and substantially parallel to said first plurality of magnets, the magnetic field created by said second plurality of magnets interact to effect a substantially uniform and continuous magnetic field in said one direction and also interact with the magnetic field created by said first plurality of magnets to substantially suppress components of said magnetic fields perpendicular to said medium while maintaining said magnetic fields created by said first and second plurality of magnets uniform and continuous and being substantially parallel to said medium to uniformly magnetize said medium in said one direction across the width of said medium as relative movement is affected between said medium and said first and second plurality of magnets.

2. The invention in accordance with claim 1 further comprising a third plurality of magnets arranged in an array extending across the width of said medium and being oriented substantially parallel to said first and said second arrays, the magnetic field created by each of said third plurality of magnets interacting with each other to effect a substantially uniform and continuous magnetic field in said one direction, said third plurality of magnets being positioned across said medium so that they positionally overlap magnets of said first and second plurality of magnets to better assure a continuous and uniform magnetic field parallel to said medium for uniformly magnetizing said medium in said one direction.

3. The invention in accordance with claim 1 further comprising means positioned behind each of said magnet arrays on the side of said magnets away from said medium for concentrating the magnetic field at said medium created by said magnet arrays.

4. The invention in accordance with claim 3 wherein each of said magnetic field concentrating means comprises an elongated magnet positioned behind each of said magnet arrays on the side of said magnets away from said medium, each of said elongated magnets having their polarity in opposition to that of the respective magnet array they are located behind to effect a concentration of the magnetic field created by said magnet arrays at said medium.

5. The invention in accordance with claim 2 further comprising means positioned behind each of said magnet arrays on the side of said magnets away from said medium for concentrating said magnetic field created by said magnet arrays at said medium.

6. The invention in accordance with claim 5 wherein each of said magnetic field concentrating means comprises an elongated magnet positioned behind each of said magnet arrays on the side thereof away from said medium, each of said elongated magnets having their polarity in opposition to that of the respective magnet array they are located behind to effect a concentration of the magnetic field at said medium created by said magnet arrays.

7. The invention in accordance with claim 1 wherein each of said plurality of magnet arrays comprises:
a plurality of block magnets arranged in a row so that unlike poles of said block magnets are closest to but spaced from each other and said row of magnets is oriented substantially parallel to said medium, and
a plurality of pole pieces with one pole piece between each pair of said block magnets in the space therebetween, said pole pieces extending beyond each of said spaces in the direction of said medium, and said pole pieces having their ends closest to said medium being shaped to effect a substantially uniform and continuous magnetic field across said field in said one direction.

8. The invention in accordance with claim 2 wherein each of said plurality of magnet arrays comprises:
a plurality of block magnets arranged in a row so that unlike poles of said block magnets are closest to but spaced from each other and said last mentioned row is substantially parallel to said medium, and
a plurality of pole pieces with one pole pieces between each pair of said block magnets in the space therebetween, said pole pieces extending beyond each of said spaces in the direction of said medium, and said pole pieces having their ends closest to said medium being shaped to effect a substantially uniform and continuous magnetic field across said field in said one direction.

9. The invention in accordance with claim 1 wherein said each of said magnets of said plurality of magnet arrays comprises an elongated manget having one pole closest to said medium and the other pole further away from said medium.

10. The invention in accordance with claim 2 wherein said each of said magnets of said plurality of magnet arrays comprises an elongated manget having one pole closest to said medium and the other pole further away from said medium.

* * * * *